US005402846A

United States Patent [19]
Jennings, Jr. et al.

[11] Patent Number: 5,402,846
[45] Date of Patent: Apr. 4, 1995

[54] UNIQUE METHOD OF HYDRAULIC FRACTURING

[75] Inventors: Alfred R. Jennings, Jr., Plano; Eve S. Sprunt, Farmers Branch, both of Tex.

[73] Assignee: Mobil Oil Corporation, Fairfax, Va.

[21] Appl. No.: 151,662

[22] Filed: Nov. 15, 1993

[51] Int. Cl.⁶ ............... E21B 43/247; E21B 43/267
[52] U.S. Cl. .................... 166/259; 166/280; 166/288; 166/295; 166/309
[58] Field of Search ............ 166/259, 280, 288, 295, 166/300, 308, 309

[56] References Cited

U.S. PATENT DOCUMENTS

| | | | |
|---|---|---|---|
| 3,363,691 | 1/1968 | Gomory | 166/280 |
| 3,373,813 | 3/1968 | Jennings et al. | 166/288 X |
| 3,525,398 | 8/1970 | Fisher | 166/288 |
| 3,638,727 | 2/1972 | Allen et al. | 166/259 |
| 3,981,362 | 9/1976 | Allen et al. | 166/259 X |
| 4,029,149 | 6/1977 | Perkins | 166/280 |
| 4,067,389 | 1/1978 | Savins | 166/246 |
| 4,157,322 | 6/1979 | Colegrove | 166/270 |
| 4,378,849 | 4/1983 | Wilks | 166/369 |
| 4,899,818 | 2/1990 | Jennings, Jr. et al. | 166/270 |
| 4,899,819 | 2/1990 | Hazlett et al. | 166/285 |
| 4,907,656 | 3/1990 | Sanchez et al. | 166/270 |
| 4,971,150 | 11/1990 | Sanchez | 166/245 |
| 4,984,635 | 1/1991 | Cullick et al. | 166/288 X |
| 5,069,283 | 12/1991 | Mack | 166/308 |

*Primary Examiner*—George A. Suchfield
*Attorney, Agent, or Firm*—Alexander J. McKillop; George W. Hager, Jr.; Charles A. Malone

[57] ABSTRACT

An improved method for hydraulically fracturing a formation or reservoir where a thermo-setting gellable mixture is utilized. This thermo-setting mixture is foamed either at the surface or in situ under fracturing pressures and conditions. The mixture and carrier fluid is of a composition such that the foamed mixture has a viscosity of sufficient magnitude to cause a created fracture to grow while the foamed mixture is kept under fracturing pressure and conditions. Once a fracture of a desired size and length has been generated, the resin is ignited and thermally set thus forming a porous hardened solid within the fracture thereby holding the fracture open. Once combustion is finished, no spent fracturing fluids or load fluids remain to be recovered. This porous solid props the fracture open thereby increasing the conductivity of the formation or reservoir and fluid flow therefrom.

8 Claims, No Drawings

UNIQUE METHOD OF HYDRAULIC FRACTURING

FIELD OF THE INVENTION

This invention relates to a method of fracturing subterranean formations surrounding oil wells, gas wells, and similar boreholes. In one aspect, the invention relates to a method which employs a thermal resin for fracturing and also as a proppant.

BACKGROUND OF THE INVENTION

Hydraulic fracturing is a well stimulation technique designed to increase the productivity of a well by creating highly conductive fractures or channels in the producing formation surrounding the well. The process normally involves two basic steps: (1) injecting a fluid at a sufficient rate and pressure to rupture the formation thereby creating a crack (fracture) in the reservoir rock, and (2) thereafter placing a particulate material (propping agent) in the formation to maintain the fracture walls open by resisting forces tending to close the fracture. If stimulation is to occur, the propping agent must have sufficient mechanical strength to bear the closure stresses and provide relatively high permeability in the propped fracture.

Many hydraulic fracturing treatments consist of elaborate mixtures of gelled fluids and proppants. The degree of success expected from well stimulation using conventional hydraulic fracturing techniques depends on the effective placement of a high permeability proppant and a generated fracture to increase the conductivity of the formation. Many wells are completed in reservoirs which are particularly fluid sensitive. Characteristics of the reservoir (low reservoir pressure, e.g.) may limit the effective application of conventional hydraulic fracturing techniques.

Although a variety of particulate materials are used as proppants, silica sand remains the only material that is used extensively. It has been long recognized, however, that sand is not the ideal proppant. Sand at closure stresses encountered in deep formations tends to disintegrate, producing fines or fragments which can drastically reduce permeability in the propped fracture.

Therefore, what is needed is a hydraulic fracturing method that provides for the effective placement of a high permeability proppant in combination with a fracturing fluid which can be used in fluid sensitive reservoirs and also in reservoirs where conventional hydraulic fracturing techniques can't be utilized.

SUMMARY OF THE INVENTION

In the practice of this invention, a thermo-setting gellable mixture that is thin at surface conditions is used as a fracturing fluid to hydraulically fracture the reservoir or formation. This thermal setting resin is foamed either at the surface or in situ and pumped downhole under fracturing pressures and conditions. The foamable mixture and carrier fluid are of a composition such that the foamed mixture has a viscosity of sufficient magnitude to cause a created fracture to grow while the foamed mixture is kept under fracturing pressure and conditions.

Once a fracture of a desired size and length has been generated, the resin is ignited and thermally set thus forming a porous hardened solid within the fracture thereby holding the fracture open. Once combustion is finished, no spent fracturing fluids or load fluids remain to be recovered. This porous solid props the fracture open thereby increasing the conductivity of the formation or reservoir and fluid flow therefrom.

It is therefore an object of this invention to effectively generate a fracture and place a proppant therein so as to increase a reservoir's conductivity.

It is another object of this invention to provide for a hydraulic fracturing method which does not require the removal of spent fracturing fluids or load fluids upon completion of the fracturing operation.

It is a further object of this invention to provide for a hydraulic fracturing method that can be used in water sensitive formations or reservoirs without damaging them.

It is yet another object of this invention to provide for a hydraulic fracturing technique which can be utilized in reservoirs or formations where conventional fracturing methods can not be utilized e.g. low pressure reservoirs.

DESCRIPTION OF THE PREFERRED EMBODIMENTS

In the practice of this invention a well is drilled into a formation. The well is cased and then selectively perforated over a one to two foot interval in the lower productive interval of the formation. A hydraulic fracturing technique is discussed in U.S. Pat. No. 4,067,389 which issued to Savins on Jan. 10, 1978. Another method for initiating hydraulic fracturing is disclosed by Medlin et al. in U.S. Pat. No. 4,378,849 which issued on Apr. 5, 1983. Both patents are hereby incorporated by reference herein. As is known by those skilled in the art, in order to initiate hydraulic fracturing in a formation, the hydraulic pressure applied must exceed the formation pressures in order to cause a fracture to form. The fracture which forms will generally run perpendicular to the least principle stress in the formation or reservoir.

Prior to fracturing the formation or reservoir, a polymeric gel fracturing fluid is prepared. After preparation, this gel is either foamed ex situ and pumped into the formation or is combined with a composition that decomposes to made a foam in situ. Polymeric gels which are preferred for use herein include furan polymers, polymers crosslinked with an aminoplast or amino resin, and gels formed from a phenol/formaldehyde resin.

A preferred aminoplast gel mixture for use herein is formed from a melamine formaldehyde resin and a crosslinkable polymer. This resin is in a class of resins known as thermo-setting resins. A method for making an aminoplast gel mixture is disclosed in U.S. Pat. No. 4,899,818 that issued to Jennings, Jr. et al. on Feb. 13, 1990. This patent is hereby incorporated by reference herein.

Acceptable polymers for use with the aminoplast resin include polyacrylamide, Kelcno's S-130 biopolymer, acrylamide modified polyvinyl alcohol ("AMPVA"), Xanthan biopolymers, poly (acrylamide-co-acryl-amido-2-methyl-propanesulfonate) "AM-AMPS", "PHILLIPS HE" polymers (a family of acrylamide containing copolymers), and polyvinyl alcohol. More specifically, "PHILLIPS HE" polymer comprises copolymers of N-vinyl-2-pyrrolidone (VP) and acrylamide (Am) in which the weight ratios of VP:Am preferably range from about 30:70 to about 70:30. Polymers mentioned in U.S. Pat. No. 4,157,322, supra, may be utilized as long as those polymers contain the required functional groups. Additional "water-dispersible polymers" are mentioned in U.S. Pat. No. 4,907,656 that issued to Sanchez, et al. on Mar. 13, 1990. Included among these are polyvinyl amine, sulfonated polyvinyl alcohol, and poly (acrylamide-2-methylpropane sulfonate). Other polymers containing OH, $NH_2$, $CONH_2$, and SH functional groups are also useful. This patent is incorporated by reference herein.

Polymer concentration in said gels range from about 0.1 to about 5.0 wt %. These polymer concentrations vary depending upon the molecular weight of polymer used. Lower molecular weight polymers require a higher polymer concentration to gel. A polymer concentration of about 0.2 to about 5.0 wt % is preferred. This crosslinking/co-gelation method produces high integrity polymer gels able to withstand high temperatures and high salinity conditions often found in subterranean hydrocarbonaceous formations.

The melamine resin that is utilized in this invention can be a commercial product such as Cyanamid's "PAREZ®" resins. Included among these melamine-formaldehyde (melamine) resins which are useful in this invention are the partially methylated resins and the hexamethoxymethyl resins (i.e. American Cyanamid's "PAREZ", "CYMEL TM" 373, "CYMEL 370, "CYMEL"303, and "CYMEL"380). The resin, however, has to be one that is soluble or dispersible in an aqueous medium. Other amino resins can also be used. Non-limiting examples are urea-formaldehyde, ethylene and propylene urea formaldehyde, triazone, uron, and gloxal resins. The amount of MF resins required for adequate gel formation is in the ratio of 10:1–1:10 polymer to amino resins. Preferred polymer concentrations are from about 0.2 to about 5.0 wt %. Amino resins are preferred crosslinkers because they (1) are economical to use; (2) can be applied to a wide variety of polymers; (3) form thermally stable, brine tolerant gels; and (4) do not need an acid or base catalyst.

The gelation rate of the composition depends on the amount of each of the components and the temperature at which the reaction is conducted. Thus, one can tailor the gel rate and gel strength of the composition by adjusting the amount of the polymer, the resin amount and the temperature. The higher the temperature at given concentrations of resin and polymer results in a faster gelation time. If a thicker gelled composition is desired, the polymer and resin concentrations may be increased for a given temperature.

When using a phenol/formaldehyde gellable composition, a phenolic compound is added to an aqueous solution or mixture containing one of the polymers above mentioned. The phenolic compound utilized can comprise any suitable water-dispersible phenol or naphthol. Suitable phenols include monohydroxy and polyhydroxy naphthols. Phenolic compounds suitable for use in the present invention include phenol, catechol, resorcinol, phloroglucinol, pyrogallol, 4,4′diphenol, 1,3-dihydroxynaphthalene, and the like. Other phenolic components that can be used include at least one member of selected oxidized phenolic materials of natural or synthetic origin such as 1,4-benzoquinone, hydroquinone or quinhydrone; as well as a natural or modified tannin such as quebracho or sulfomethylated quebracho. Resorcinol is the phenolic compound preferred for use herein in an amount of from about 0.25 to about 5.0 wt %, preferably about 0.5 to about 3.0 wt %. Other phenolic compounds can be employed in an amount comparable to that in molar concentration.

In the next step, a water-dispersible aldehyde is added to the mixture. Under proper conditions of use, both aliphatic and aromatic monoaldehydes, and dialdehydes, can be used. The aliphatic monoaldehydes containing from 1 to about 10 carbon atoms per molecule are presently preferred. Representative examples of such aldehydes include formaldehyde, trioxane, tetraoxane, polyoxymethylene, and other polymeric aldehydes. Representative examples of dialdehydes include glyoxal, glutaraldehyde, terephthaldehyde, and mixtures thereof. The term "water-dispersible" is employed generically to include both those aldehydes which are truly water-soluble and those aldehydes of limited water solubility but which are dispersible in water or other aqueous media so as to be effective gelling agents. The preferred aldehyde is trioxane.

Any suitable amount of trioxane and phenolic compounds can be utilized herein. In all instances, the amount of aldehyde and phenolic compound used should be small but in an amount sufficient to cause gelation of an aqueous dispersion of a polymer, the aldehyde, and the phenolic compound. As a general guide, the amount of aldehyde used in preparing the gel compositions herein will be in the range of from about 0.05 to about 5, preferably 1.0 to about 3.0 wt % based on the total weight of the composition. Aldehyde and dialdehyde should be included in the mixture in about 0.25 to about 5.0 wt %. Formaldehyde is used in the mixture in about 0.5 to about 3.0 wt %.

As previously mentioned, the gelation rate depends on the amount of each component and the temperature at which the reaction is conducted. The resultant mixture results in a thermo-setting gellable mixture that forms a solid gel.

Either of the above gellable mixtures is combined with a gas or mixture of gases in combination with a surfactant to make foam during the fracturing operation. The gases comprise nitrogen, oxygen, and mixtures thereof. Other methods for making a foamable mixture are disclosed in U.S. Pat. No. 4,971,150 that issued to Sanchez on Nov. 20, 1990. This patent is hereby incorporated by reference herein.

In carrying out this invention, a crosslinked furan gellable mixture, a crosslinked aminoplast gellable mixture, or a phenol/formaldehyde gellable mixture, is prepared in an amount sufficient to hydraulically fracture the reservoir or formation. In a preferred embodiment, the foamable mixture is used as the fracturing fluid which is pumped into the well under conditions sufficient to fracture the formation. A mixture of nitrogen and oxygen is injected into the foamable mixture as it is placed into the formation via the wellbore. This causes foam to form because of the presence of a surfactant within the mixture. Since a foam is formed, the viscosity of the mixture increases thereby causing the fracture to grow as the foamed gellable mixture is being pumped into the reservoir at fracturing pressures.

This viscosity increase also causes the pressure within the reservoir or formation to be maintained during the fracturing operation which keeps the fracture open and filled with the foam.

Should it be desired to cause the mixture to foam after being placed in the created fracture, chemical blowing agents can be placed into the gellable mixture prior to starting the fracturing operation. Fracturing pressure is applied and maintained on the mixture until the chemical blowing agent in the mixture decomposes in the created fracture. Upon decomposition the gel or resin mixture foams in situ thereby maintaining the pressure within the formation, keeping the fracture open, filling the fracture with foam, and causing the fracture to propagate further into the formation or reservoir. Chemical blowing agents are disclosed in U.S. Pat. No. 4,899,819 which issued to Hazlett et al. This patent is hereby incorporated by reference herein.

Once the fracturing operation is completed, pressure is maintained on the reservoir or formation and the mixture is ignited causing combustion which causes the mixture to thermally set and harden. Ignition is accomplished by use of a wire line igniter. After combustion, a hardened, porous solid remains in the fracture. This hardened, porous solid keeps the fracture opened or propped. Because it is porous, conductivity within the formation or reservoir is increased. Increase conductivity results in increased amounts of hydrocarbonaceous fluids being removed from the reservoir or formation. This method is particularly advantageous in that following combustion no spent fracturing fluids or load fluids remain to be recovered.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed:

1. An improved method for hydraulically fracturing a reservoir comprising:
   a) pumping a foamable thermo-setting mixture into the reservoir under a pressure and conditions sufficient to hydraulically fracture the formation;
   b) causing the foamable thermo-setting mixture to make a foam and fracture the formation; and
   c) igniting and combusting said mixture thereby causing the mixture to thermally set and harden into a porous solid which props the fracture and substantially increase the conductivity of the reservoir.

2. The method as recited in claim 1 where in step b) the mixture is foamed ex situ.

3. The method as recited in claim 1 where in step b) the mixture is foamed in situ.

4. The method as recited in claim 1 where said mixture comprises a water-dispersible polymer crosslinked with a thermosetting aminoplast resin.

5. The method as recited in claim 1 where said thermosetting mixture contains a chemical blowing agent that is foamed in situ by a chemical blowing agent that decomposes in the hydraulic fracture.

6. The method as recited in claim 1 where said mixture comprises a water-dispersible polymer crosslinked with a phenol/formaldehyde resin.

7. The method as recited in claim 1 where said mixture comprises a crosslinked furan mixture.

8. The method as recited in claim 1 where in step b) nitrogen, oxygen and mixtures thereof are used to make the foam.

* * * * *